United States Patent [19]

Lapin

[11] Patent Number: 4,775,732

[45] Date of Patent: Oct. 4, 1988

[54] VINYL ETHER TERMINATED ESTER AND URETHANE RESINS FROM BIS(HYDROXYALKYL)CYCLOALKANES

[75] Inventor: Stephen C. Lapin, Wauconda, Ill.

[73] Assignee: Allied-Signal Inc., Morristown, N.J.

[21] Appl. No.: 141,868

[22] Filed: Jan. 11, 1988

[51] Int. Cl.$^4$ .............................................. C08G 18/04
[52] U.S. Cl. ...................... 528/49; 526/301; 526/308; 528/301; 528/302; 528/305; 528/307; 560/25; 560/84; 560/115
[58] Field of Search ............... 528/49, 301, 302, 305, 528/307; 560/25, 84, 115; 526/301, 308

[56] References Cited

U.S. PATENT DOCUMENTS 3,907,865  9/1975  Miyata et al. ...................... 528/49
4,125,571 11/1978  Scott et al. ......................... 528/307

OTHER PUBLICATIONS

"R. Holman Ed. Selective Industrial Training Associates", London (1984, p. 147).

Primary Examiner—Maurice J. Welsh
Attorney, Agent, or Firm—Thomas K. McBride; Eugene I. Snyder

[57] ABSTRACT

There are described vinyl ether terminated ester and urethane oligomers which cure or polymerize particularly rapidly, especially by cationic polymerization which is radiation induced in the presence of an onium salt. The oligomeric units arise most often from the reaction of a dicarboxylic acid or diisocyanate with a diol. The carboxyl-terminated oligomeric esters are esterified with vinyl ether terminated alcohols which can be thought of as the adducts of alkynes and diols which are bis(hydroxyalkyl)cycloalkanes where the cycloalkane is of ring size 5 through 8.

42 Claims, No Drawings

VINYL ETHER TERMINATED ESTER AND URETHANE RESINS FROM BIS(HYDROXYALKYL)CYCLOALKANES

BACKGROUND OF THE INVENTION

Vinyl ethers are extremely reactive monomers which are known to undergo polymerization by a cationic mechanism readily induced by ultraviolet or electron beam radiation and which are useful in applications which require high speed curing. Vinyl ethers undergo cationic curing much faster than the epoxy resins and therefore may be used for printing inks, coatings, elastomers, foams, and other types of materials dependent upon the ability of the formulation to cure at a rate which is consistent with other processing steps. A disadvantage attending the use of vinyl ethers is their relatively limited commercial availability. In general, the available vinyl ethers are low molecular weight monofunctional or difunctional monomers, whereas in most commercial applications higher molecular weight oligomeric materials are preferred for their lower volatility and more desirable rheological properties.

The present invention discloses vinyl ether terminated esters and urethanes from bis(hydroxyalkyl)cycloalkanes. As will be seen, the structure of such materials is susceptible to wide variations with a minimum change in the reactants. This flexibility permits facile variation in the properties and characteristics of the materials of our invention as well as comparable variations in the resulting cured polymers. Where the oligomer contains more than one vinyl ether group the cured materials are extensively cross-linked, very high molecular weight polymers. The polymers have a wide range of properties depending upon the structure of the oligomeric precursor. Although the vinyl ether terminated esters and urethanes of this invention have been designed to fill the need for radiation curable coatings, they may have a much broader use. In particular, the materials of our invention are readily polymerized by means other than radiation curing, and the resulting polymers are meant to be subsumed in our invention. What appears unique to the materials of our invention, and to bis(hydroxyalkyl)cycloalkanes as diols used in their preparation, is that coatings based on our materials give greatly improved adhesion to metal substrates. Adhesion to metals has been a weak performance area for radiation cured coatings generally. (UV and EB Curing Formulations for Printing Inks, Coatings, and Paints, "R. Holman Ed. Selective Industrial Training Associates, London (1984, p. 147)).

SUMMARY OF THE INVENTION

The purpose of our invention iss to provide vinyl ether esters and urethanes which are readily and economically synthesized, with structures susceptible to a large number of permutations each of which are easily made, with the resulting materials able to be radiation cured to afford polymer coatings exhibiting superior metal adhesion. An embodiment encompasses vinyl ether terminated oligomeric esters and urethanes where the alcohol portion of the ester or urethane is a vinyl ether which can be viewed as the adduct of an acetylenic compound and a bis(hydroxyalkyl)cycloalkane. In a more specific embodiment the adduct is that of an acetylenic compound and a bis(hydroxymethyl)cyclohexane. In a further embodiment the acetylenic compound is a terminal acetylene. In a still further embodiment the acid portion of the ester is a dicarboxylic acid. In yet another specific embodiment the urethane results from toluene diisocyanate. Other embodiments will become apparent from the detailed discussion within.

DESCRIPTION OF THE INVENTION

The invention to be described in greater detail within is a class of compounds with a broad spectrum of molecular weight but which is characterized by the presence of one or more terminal vinyl ether moieties and which are esters of carboxylic acids or are urethanes. One of the reactants used in making the products of our invention is, or may be viewed as, an adduct of an acetylenic compound (an alkyne) with bis(hydroxyalkyl)cycloalkanes, the resulting material being a vinyl ether terminated alcohol. For simplicity, a generic alcohol, HOXOH, will be used in this section as representative of the diols of this invention to illustrate one means of preparing the vinyl ether terminated alcohol under discussion, namely,

If the vinyl ether terminated alcohol is prepared as an adduct, usually reaction conditions are so chosen as to form the monoadduct either to the virtual exclusion of the diadduct or, more likely, in large preponderance relative to the diadduct. The monoadduct can be isolated and used in a purified form, but more often the entire reaction mixture is used as the alcoholic reactant in ester formation with carboxylic acids or urethane formation with isocyanates, where the unreacted glycol serves as a chain extender.

Where esters are desired, the vinyl ether terminated alcohol is then reacted with a carboxylic acid. In reality, the alcohol is reacted with some activated derivative of a carboxylic acid, such as an acid chloride or ester, but for simplicity and clarity of exposition we shall continue to refer to reaction with a carboxylic acid. Where the acid is a dicarboxylic acid the reaction may be represented as,

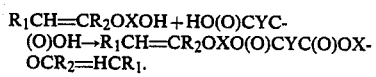

The above reaction is most accurate where the alcoholic reactant is solely

and in the more usual cases where the alcoholic reactant is a mixture containing unreacted glycol, or where a second glycol is added to the vinyl ether terminated alcohol, at least some of the product can be envisioned as arising from the reaction sequence,

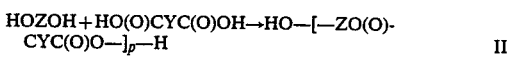

The oligomeric ester II can then react with the vinyl ether terminated monomeric ester I to afford the new ester III which can be end-capped by esterification with a vinyl ether terminated alcohol to afford the oligomeric product IV, as shown below $$I + II \rightarrow R_1CH=CR_2OXO(O)CYC(O)O-[-ZO(O)CYC(O)O-]_p-H \qquad III$$

$$III + HOXOCR_2=CHR_1 \rightarrow R_1CH=CR_2OXO(O)CYC(O)O-[-ZO(O)CYC(O)O-]_p-X-OCR_2=CHR_1 \qquad IV$$

The oligomeric esters of structure IV need not arise from the precise reaction sequence shown above, for other sequences can lead to the same oligomeric esters. The foregoing sequence was illustrated for convenience in following the preparative route to our esters and in arriving at our structural representation of the oligomeric esters of our invention. An analogous reaction sequence can be written to depict the vinyl ether terminated urethanes of our invention, where the urethanes result from reaction of an alcohol with a polyisocyanate as represented by the diisocyanate OCNQNCO.

$$HOZOH + OCNQNCO \rightarrow OCN[QNHC(O)OZO(O)CNH]_qQNCO \qquad V$$

$$V + 2R_1CH=CR_2OXOH \rightarrow R_1CH=CR_2OXO(O)CNH[QNHC(O)OZO(O)CNH]_qQNHC(O)OXOCR_2=CHR_1 \qquad VI$$

$$2R_1CH=CR_2OXOH + OCNQNCO \rightarrow R_1CH=CR_2OXO(O)CNHQNHC(O)OXOCR_2=CHR_1 \qquad VII$$

The reaction sequences shown above for ester and urethane formation clearly indicate the diversity and complexity of the materials of this invention, as well as suggesting the rather large number of discrete compounds which can be, and usually will be, present in the reaction product mixture which is used as, or as part of, the uncured resin. All of these discrete compounds are intended to be subsumed in and encompassed by our invention. For simplicity and ease of exposition only we may represent our product by the oligomeric members of the class, $$R_1CH=CR_2OXO(O)CYC(O)OXOCR_2=CHR_1$$

and $$R_1CH=CR_2OXO(O)CNHQNHC(O)OXOCR_2=CHR_1,$$

but it is to be understood that these are merely representative of the entire class which includes the non-oligomeric and oligomeric products of our vinyl ether alcohols and a dicarboxylic acid or diisocyanate.

The vinyl ether terminated alcohols which are used in preparing the oligomeric esters of this invention have a structure corresponding to the adduct of an alkyne and a bis(hydroxyalkyl)cyclohexane. It must be emphasized that although some of the vinyl ether terminated alcohols of this invention may in fact be made by the addition of these diols to alkynes, these vinyl ether terminated alcohols also can be made in other ways, and the alternative routes may even be preferred. The alkyne has the generic formula $R_1CCR_2$, and the diol has the generic formula $[HO(CH_2)_n]_2R$, where n is an integer from 1 to about 6, and R is a divalent radical whose parent is a cycloalkane. The generic formula of the vinyl ether terminated alcohols of our invention is then $$R_1CH=CR_2O(CH_2)_nR(CH_2)_nOH.$$

The groupings $R_1$ and $R_2$ are independently selected from the group consisting of hydrogen and lower alkyl moieties containing from 1 to 10 carbon atoms, although those with from 1 to about 4 carbon atoms are favored. It is preferable that both $R_1$ and $R_2$ are not alkyl moieties, for that case causes a reduction in polymerization rate of the oligomers of our invention to a point where the polymerization rate is undesirable. Where $R_1$ is an alkyl moiety it is preferred that $R_2$ be hydrogen, and conversely; those cases where $R_2$ is hydrogen and $R_1$ an alkyl of 1 to 4 carbons are quite desirable. In a preferred embodiment $R_1(R_2)$ is a methyl group and $R_2(R_1)$ is hydrogen. In a still more preferred embodiment both $R_1$ and $R_2$ are hydrogen.

The diols used in the practice of this invention are bis(hydroxyalkyl)cycloalkanes whose formula is $(HO(CH_2)_n)_2R$. It is to be noted that in all cases the hydroxyl moiety is a primary hydroxyl, i.e., it is located at the end of the alkylene chain. In the diols of our invention n is an integer from 1 through about 6, preferably from 1 to 3, and the member where n=1 is highly preferred. R is a divalent radical whose parent is a cyclopentane, cyclohexane, cycloheptane, or cyclooctane, with the cyclohexanes being favored because of their relative availability.

Examples of the diols used in the practice of this invention include bis(hydroxymethyl)cyclopentane, bis(2-hydroxyethyl)cyclopentane, bis(3-hydroxypropyl)cyclopentane, bis(4-hydroxybutyl)cyclopentane, bis(5-hydroxypentyl)cyclopentane, bis(6-hydroxyhexyl)cyclopentane, bis(hydroxymethyl)cyclohexane, bis(2-hydroxyethyl)cyclohexane, bis(3-hydroxypropyl)cyclohexane, bis(4-hydroxybutyl)cyclohexane, bis(5-hydroxypentyl)cyclohexane, bis(6-hydroxyhexyl)cyclohexane, and the cycloheptane and cyclooctane analogs of the foregoing diols.

As regards the orientation of the hydroxy alkyl groups, the preferred members are the 1,3-bis(hydroxyalkyl)cyclopentanes and the 1,4-bis(hydroxyalkyl)cyclohexanes, -cycloheptanes, and -cyclooctanes. Diols substituted at positions different from those specified above may be used in the practice of this invention, but not necessarily with equivalent results. The bis(hydroxymethyl)cyclohexanes are a highly preferred diol used in the practice of this invention as they are readily available from the reduction of the corresponding phthalic acids, and among these 1,4-bis(hydroxymethyl)cyclohexane is greatly favored.

In one branch of the invention, the vinyl ether terminated alcohol is reacted with a carboxylic acid, generally a dicarboxylic acid, to afford a vinyl ether terminated ester. There are four quite distinct variants here. In one variant the purified vinyl ether terminated alcohol alone is reacted with the acid. In a second variant a mixture of the vinyl ether terminated alcohol and the unreacted diol from which it was made, or could be thought of as being made, is reacted with the acid. In this variant the diol acts as a chain extender by esterifying the polycarboxylic acid to give an oligomeric ester where X=Z. In another variant a mixture of the vinyl ether terminated alcohol and a second, unrelated polyol is reacted with the acid. Again the polyol acts as a chain extender via ester formation with the carboxylic acid, but in this case X and Z are different. Finally, in a fourth variant a mixture of vinyl ether terminated alcohol, unreacted diol from which it was made or could be thought to be made, and a second, unrelated polyol is reacted with the carboxylic acid. As in the cases above, the unreacted polyols react with the carboxylic acid to afford oligomeric esters, and in this variant some of Z are different from X and some are the same.

The components of the alcohol mixture reacting with the carboxylic acid are $R_1CH=CR_2OXOH$ (component A), $X(OH)_2$ (component B), and $Z(OH)_s$ (component C), where $Z(OH)_s$ may be another diol of this invention or some other polyol. In the reactant alcohol mixture the molar proportions of $(B+C)/A$ may be between 0 and about 100. Where the ratio is 0 there is no free polyol. This is the unusual and exceptional case; generally the alcohol mixture will contain not only a vinyl ether terminated alcohol but also some polyol, generally the diols of this invention. In the preferred case the ratio above is between about 0.5 and about 10. Additionally, the alcohol mixture also may contain the diadduct, $R_1CH=CR_2OXOCR_2=CHR$, which does not enter into ester (or urethane) formation but which may serve as a diluent for the reaction mixture and which may copolymerize with the vinyl ether esters and urethanes during curing.

Among the polyols $Z(OH)_s$ which may be used is the class of alkylene glycols, $HO(C_nH_{2n})OH$, where n is an integer from 2 to about 10. The linear alkylene glycols, $HO(CH_2)_nOH$, (polymethylenediols), where n is an integer from 2 to about 10, are particularly useful, especially where n is from 2 to about 6. Illustrative of the members of this group are such diols are ethylene glycol, 1,3-propylene glycol, 1,4-butanediol, 1,5-pentanediol, 1,6-hexanediol, 1,7-heptanediol, 1,8-octanediol, 1,9-nonanediol, and 1,10-decanediol(-decamethylene glycol).

The nonlinear or branched alkylene diols also may be used to supply the fragment —OZOH, where such glycols contains from 3 up to about 10 carbon atoms. Examples include 1,2-propylene glycol, 2,3-butanediol, 2,3-dimethyl-2,3-butanediol, 2,3-dimethyl-1,4-butanediol, etc.

Another class of diols useful as a source of the grouping $Z(OH)_s$ are the polyalkyleneoxy glycols, especially poly(ethyleneoxy)glycols, $[—CH_2CH_2O—]_m$, and poly(propyleneoxy)glycol, $[—CH(CH_3)CH_2O—]_m$, where m is an integer from 1 up through about 50, although more usually m is an integer from 1 up to about 10, and most preferably from 1 up to about 5. Examples of the glycols in this branch of the invention include diethylene glycol, triethylene glycol, tetraethylene glycol, pentaethylene glycol, hexaethylene glycol, etc., along with the analogs of the propyleneoxy glycols.

Among the fragments whose parents are triols, $Z(OH)_3$, may be mentioned trimethylolpropane, glycerol, trishydroxyethyl trimethylolpropane, and pentaerythritol monoacetate. Among the fragments whose parent is a tetrahydroxy compound $Z(OH)_4$ may be mentioned such polyols as pentaerythritol and tetrahydroxyethyl pentaerythritol.

As alluded to above, the reaction between alcohols and carboxylic acids to give the esters of this invention is too slow to be a practical method of preparation, and activated derivatives of carboxylic acids are in fact used as reactants. Among such derivatives the acid chlorides and esters are most frequently employed, and the following description refers to the carboxylic acids which are parents of the activated acid derivatives used to prepare our oligomeric esters.

The carboxylic acids which may be used, or which are parents of activated derivatives which may be used in the practice of this invention, are dicarboxylic acids.

Perhaps the most important case is that where the dicarboxylic acid is esterified with an alcohol mixture of a vinyl ether terminated alcohol having appreciable amounts of unreacted polyol. The dicarboxylic acids which are most useful in this branch of the invention are those which are typically used in polyamide (nylon) and polyester fiber production, and include aromatic dicarboxylic acids such as the phthalic acids, especially isophthalic and terephthalic acid. The polymethylene dicarboxylic acid series also is important and is exemplified by the formula $HO_2C(CH_2)_rCO_2H$, where r is an integer from 2 up to about 10. Members of this series are succinic, glutaric, adipic, pimelic, suberic, azelaic, and sebacic acids, with adipic acid being the outstanding example of this series. Other dicarboxylic acids which may be used in the practice of this invention include para-phenylene diacetic acid, paraphenylene dipropionic acid, 4,4'-dibenzylic acid, 5-t-butylisophthalic acid, and 1,6-naphthalene dicarboxylic acid.

Where the alcohol mixture contains 1 or more diols there are 3 subvariants possible. In all cases the alcohol mixture contains at least one vinyl ether terminated alcohol, and the subvariants are the cases where the mixture also contains the diol containing the structural grouping found in the ether, an unrelated diol or polyol, or a mixture of the above. In either of these cases, the ratio of molar proportions of diol to vinyl ether terminated alcohol is from about ½ to about 100, preferably from about ½ to about 10. Therefore, in the formula IV p equals 1–200, but preferably from 1–20.

In the second branch of this invention the vinyl ether terminated alcohol is reacted with a diisocyanate monomer or an isocyanate prepolymer. Just as there were four distinct variants in the branch where the vinyl ether terminated alcohol was reacted with a dicarboxylic acid, so there are four analogous variants here which need not be repeated.

A broad variety of polyisocyanates may be used in this branch of the invention and may be exemplified by such materials as the toluene diisocyanates (TDI), p- and m-phenylene diisocyanate, tetramethylene diisocyanate, 1,6-hexamethylene diisocyanate, 1,4-cyclohexylene diisocyanate, 4,4'-methylenedicyclohexyl diisocyanate (Desmodur W), 4,4'-methylenediphenyl diisocyanate (MDI), 3,3'-dimethyl-4,4'-diphenylmethane diisocyanate, 1,5-tetrahydronaphthalene diisocyanate, dianisidine diisocyanate, bitolylene diisocyanate, naphthalene-1,4'-diisocyanate, bis(2-methyl-3-isocyanatephenyl)methane, bis(3-methyl-4-isocyanatephenyl)methane, and 4,4'-diphenylpropane diisocyanate.

Polyphenyl polyisocyanates such as are described and discussed in U.S. Pat. No. 4,433,067, especially the polyisocyanates based on methylenediphenyl diisocyanate, especially the 4,4'-isomer and the uretonimine modified MDI as described there, also may be utilized. The term polyisocyanate also includes quasi prepolymers of polyisocyanates with active hydrogen containing materials where the polyisocyanate is typically reacted with from about 0.05 to about 0.3 equivalents of a polyol. Although a vast number of polyisocyanates are suitable, in practice polyisocyanates based on MDI and TDI may be preferred for economy and general availability. However, aliphatic isocyanates exhibit non-yellowing properties which are especially important for coatings. Among the more desirable aliphatic isocyanates may be mentioned 4,4'-methylenedicyclohexyl diisocyanate (Desmodur W) and 3-isocyanatomethyl- 3,5,5-trimethylcyclohexyl isocyanate (isophorone diisocyanate).

As was the case in the esters of this invention, in the reactant alcohol mixture as previously defined and elaborated on the molar proportions of (B+C)/A may be between 0 and about 100. It is unusual for the reactant alcohol mixture to contain no free diol, and generally it also will contain the diadduct, as previously stated. In the preferred case the above ratio is between about 0.5 and about 10.

An important characteristic of our invention is that in all cases there are essentially no free hydroxyl groups arising from the diol or polyol in the final product. That is, less than about 5% of the initial hydroxyl groups of the alcohol remain unreacted. This is desirable to afford a polymer with good characteristics. It is most preferable that the oligomeric ether product contain no detectable free hydroxyl groups, i.e., less than about 1% of the initial hydroxyl groups of the reactant alcohol mixture remain unreacted.

The vinyl ether terminated oligomeric esters and urethanes of this invention may be cured or polymerized by any method known in the art. For example, the resins may be radiation cured, as for example by being subjected to an electron beam of an energy in the range from about 50 up to perhaps 500 KeV with a dosage from about 0.1 to about 10.0 Mrads. Electron beam curing may be performed advantageously in the presence of an iodonium or a sulfonium salt to afford high speed cationic polymerization. Ultraviolet curing in the presence of an onium salt also may be effected to afford cationic polymerization. Other means include thermal curing in the presence of a Lewis acid, such as boron trifluoride, or in the presence of a strong acid such as p-toluenesulfonic acid and trifluoromethylsulfonic acid. All these methods of polymerization are well known to those versed in the art and need not be elaborated upon further.

The following examples are only illustrative of our invention which is not to be limited thereto or circumscribed thereby in any way.

Samples to be cured were coated onto either Bonderite-40 treated steel test panels (Parker Chemical) or polyethylene coated paper board. An excess of the sample was placed at one end of the substrate and a #6 wire wound rod was drawn across the substrate with even pressure pushing excess material off the edge. This method produced coatings with a thickness of 6 to 12 μm. An RPC model QC-1202 processor was used for UV curing. The unit was equipped with two 12 inch medium pressure mercury arc lamps and a variable speed conveyor (50 to 500 ft/min). Only one lamp was used at a time in the testing (operated at 200 watts/in). An Energy Sciences Electrocurtain model CB-150 equipped with a 15 cm linear cathode was used for EB curing. Electron energies of 160 KeV were employed. Samples were placed in an aluminum tray on a variable speed conveyor (20-235 ft/min) within the CB-150 unit. Irradiation occurred in a nitrogen atmosphere.

The coatings were evaluated within one hour after irradiation. The coatings were examined for solvent resistance using methyl ethyl ketone. The number of double rubs necessary to break through the coatings was recorded. Reverse impact was measured on the steel panels using a Gardner impact tester according to ASTM Method D2794. The coating elongation was measured by bending the coated steel panel over a conical mandrel according to ASTM Method D522. Adhesion was measured according to ASTM D 3359 using Scotch 610 adhesive tape. Pencil hardness was measured according to ASTM D3363.

EXAMPLE I

Preparation of 4-hydroxymethylcyclohexylmethyl Vinyl Ether(4-HMCMVE)

1,4-bis(hydroxymethyl)cyclohexane (300 g) was combined with 12 g of KOH in a 500 mL, 3 neck round bottom flask. The flask was fitted with a stirrer, condenser, and a gas inlet tube. The mixture was heated for 6 hours at 175±5° C. while bubbling acetylene through the mixture at a rate of about 1.0 liter per minute. The products were purified by fractional distillation (boiling range 75° to 95° C. at 0.15 torr). Approximately equal amounts of 4-hydroxymethylcyclohexylmethyl vinyl ether, 1,4-bis(vinyloxymethyl)cyclohexane and unreacted diol were recovered.

EXAMPLE II

Preparation and Curing of an Aromatic Vinyl Ether Ester

4-Hydroxymethylcyclohexylmethyl vinyl ether (10 g, 0.060 mol) was combined with dimethyl isophthalate (2.86 g, 0.15 mol) in a 50 mL round bottom flask fitted with a distillation head. Three drops of titanium isoproxide were added. Methanol (approx. 1.0 mL) was produced by heating the mixture at 170° to 190° C. A vacuum (0.3 torr) was then applied to distill off the excess 4-hydroxymethylcyclohexylmethyl vinyl ether. The resulting product was a low melting waxy white solid. The $^1$HNMR was consistent with the expected product as shown below.

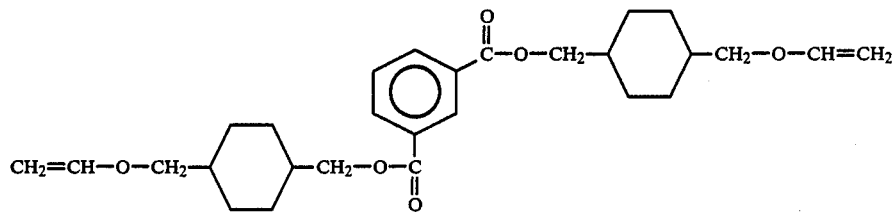

The product was combined with a triarylsulfonium salt (UVE-1016, General Electric, 2%). It was then coated on treated steel panels and cured by UV irradiation. The curing was also evaluated in the presence of 50% triethylene glycol divinyl ether (see Table 1).

EXAMPLE III

Preparation and Curing of an Aromatic Vinyl Ether Urethane

Diphenylmethane diisocyanate (16.0 g, 0.064 mol), 4-hydroxymethylcyclohexylmethyl vinyl ether (11.1 g, 0.064 mol) and trimethylol propane (2.86 g, 0.0213 mol)

were dissolved in 70 mLs of methylene chloride in a 250 mL round bottom flask. Two drops of dibutyltin dilaurate were added and the mixture was stirred under nitrogen. After a few minutes the mixture began to reflux. The reaction mixture returned to room temperature after about 2 hours. The mixture was stirred overnight at room temperature. The IR spectrum of the mixture showed that only a trace of —NCO remained. The methylene chloride was removed under vacuum. A high viscosity clear liquid product remained. GPC analysis showed a distribution of products ($<M>_n=2,020$, $<M>_w=9,660$). The product was mixed with 1,4-bis(vinyloxymethyl)cyclohexane (CDDVE) (50%) and the aforementioned triarylsulfonium salt (2%) before coating and curing. Results are shown in the Table. Note the adhesion values of 80 to 100% for the materials shown in the Table. This is compared to earlier work in which adhesion values of 0 to 10% were typically observed for vinyl ether ester an vinyl ether urethane based coatings.

EXAMPLE IV

Preparation and curing of an aliphatic vinyl ether urethane 4,4'-Methylenedicyclohexyl diisocyanate (22.0 g, 0.084 mol), 4-hydroxymethylcyclohexylmethyl vinyl ether (15.0 g, 0.088 mol) and trimethylol propane (3.76 g, 0.028 mol) were dissolved in 110 mLs of methylene chloride in a 250 mL round bottom flask. Two drops of dibutyltin dilaurate were added and the mixture was heated at reflux for 4 hours under nitrogen. The methylene chloride was evaporated at reduced pressure to leave a white solid whose GPC analysis showed a distribution of products ($<M>_n=1,600$, $<M>_w=4,100$). The product was mixed with triethylene glycol divinyl ether (50%) and a triarylsulfonium salt (General Electric UVE-1016, 2%) before coating and curing. The resulting are shown in Table 1.

TABLE 1
Properties of Coatings Derived from 4-HMCMVE

| Property | VEE[c] | VEE[c] + 50% TEGDVE[d] | AROMATIC VEU[e] + 50% CDDVE[f] | ALIPHATIC VEU[g] + 50% TEGDVE |
|---|---|---|---|---|
| Cure Speed[a] (ft/min) | 100 | >500 | 350 | 300 |
| MEK Rubs | 14 | >200 | >200 | 90 |
| Adhesion[b] | 100% | 80% | 100% | 20% |
| (Treated Steel) Pencil Hardness | 2B | 4H | 2H | 2H |
| Elongation | >50% | >50% | 14% | >50% |
| Reverse Impact (in-lbs) | >160 | >160 | 15 | >160 |

[a]One 200 w/in medium pressure mercury arc lamp.
[b]ASTM method D3359-83.
[c]VEE is aliphatic vinyl ether ester of Example II.
[d]TEGDVE is triethylene glycol divinyl ether.
[e]VEU is vinyl urethane of Example III.
[f]CDDVE is 1,4-bis(vinyloxymethyl)cyclohexane.
[g]Aliphatic VEU is that of Example IV.

EXAMPLE V

Preparation and Curing of an Aliphatic Vinyl Ether Ester

4-Hydroxymethylcyclohexylmethyl vinyl ether (40 g, 0.235 mol) was combined with dimethyl adipate (10.2 g, 0.059 mol) in a 100 mL, three neck round bottom flask fitted with a condenser, thermometer and nitrogen inlet tube. A nitrogen purge was started (approx. 2 liters/min.) to remove methanol as it was produced. Titanium isoproxide was added (15 drops) and the mixture was heated at 90° C. for 5 hours. The flask was fitted with a distillation head and the excess 4-hydroxymethylcyclohexylmethyl vinyl ether was removed under vacuum (0.3 torr). The resulting product was a low melting waxy white solid. The 'HNMR was consistent with the expected shown below.

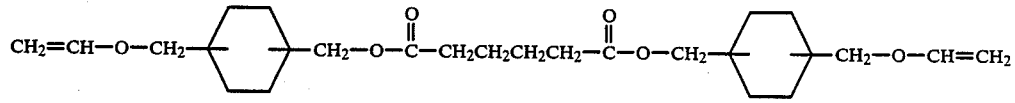

Coatings were formulated by mixing the product with triethylene glycol divinyl ether in the presence of a triarylsulfonium salt (General Electric UVE-1016, 2%). The results, as shown in Table 2, demonstrate the marked increase in metal adhesion resulting from inclusion of even 20% of this ester into the formulation.

TABLE 2
Properties of Coatings from an Aliphatic VEE

| VEE (%) | TEGDVE (%) | UV Cure Speed[a] (ft/min) | EB Cure Speed[b] (Mrads) | MEK Rubs[c] | Adhesion, Treated Steel % | Pencil Hardness | Elongation (%) | Reverse Impact (in lbs) |
|---|---|---|---|---|---|---|---|---|
| 0 | 100 | >500 | 0.3 | >100 | 0 | 2H | 14 | 15 |
| 20 | 80 | >500 | 0.5 | >100 | 85 | 2H | 17 | 20 |
| 40 | 20 | >500 | 1.0 | >100 | 90 | 3H | 17 | 38 |
| 60 | 40 | >500 | 1.0 | >100 | 90 | 4H | 25 | 40 |
| 80 | 20 | >500 | 1.5 | >100 | 80 | 4H | 28 | 42 |

[a]One 200 w/in medium pressure mercury arc lamp
[b]Minimum dose at 160 KeV
[c]After UV cure at 250 ft/min.

EXAMPLE VI

For the purpose of comparison radiation curable coatings which are not based on bis(hydroxyalkyl)cyclohexanes was evaluated. The coating formulations were combined with appropriate photoinitiators and were then coated and cured by the same methods used in Examples II through V. Both acrylate and vinyl ether based materials were used. The results are shown in Table III. Note the low adhesion values compared to bis(hydroxyalkyl)cyclohexane based vinyl ethers shown in Tables I and II.

TABLE III

Adhesion of UV Cured Coating to Treated Steel Panels

| Coating Description | Adhesion (%) |
|---|---|
| 50% Celrad 3700 (epoxyacrylate) 50% Trimethylol propane ethoxytriacrylate | 0 |
| 50% CMD 6700 (urethane acrylate) 50% Trimethylol propane ethoxytriacrylate | 10 |
| 50% Triethylene glycol monovinylether terminated MDI urethane 50% triethylene glycol divinyl ether | 10 |
| 100% bis(4-vinyloxybutyl)isophthalate | 0 |

Adhesion values for a wide range of conventional multifunctional acrylate based radiation curable coatings have been reported (B. Christmas, *Conference Proceedings, Radcur '86*, Society of Manufacturing Engineers, 1986). This study used the same treated steel substrates as used in Examples II–VI above. The majority of adhesion values reported were less than 10%.

What is claimed is:

1. A vinyl ether terminated oligomeric ester of the formula, $$R_1CH=CR_2OXO(O)CYC(O)O-[-ZO(O)CYC-(O)O-]_p-XOCR_2=CHR_1,$$

or a vinyl ether terminated oligomeric urethane of the formula, $$R_1CH=CR_2OXO(O)CNH[QNH-C(O)OZO(O)CNH]_pQNHC(O)OXOCR_2=CHR_1$$

where:
R₁ and R₂ are independently selected from the group consisting of hydrogen and lower alkyl moieties containing up to about 10 carbon atoms; HOXOH is a diol of formula $[HO(CH_2)_n]_2R_3$ where n is an integer from 1 to about 6, and R₃ is a divalent radical whose parent is a saturated cyclic hydrocarbon of ring size 5 to 8 carbons;
HOZOH is the same as HOXOH; or is an alkylene diol of the formula $HO(C_qH_{2q})OH$, where q is an integer from 2 to about 10; or a poly(ethyleneoxy) or poly(propyleneoxy)glycols, $HO-[-CH_2CH_2O-]_m-H$ or $HO-[-CH(CH_3)CH_2O-]_m-H$, respectively, where m is an integer from 1 to about 50;
p is 0 or an integer from 1 to about 200;
HO₂CYCO₂H is a dicarboxylic acid selected from the group consisting of phthalic acids, polymethylene dicarboxylic acids, $HO_2C(CH_2)_rCO_2H$, where r is an integer from 2 to about 8, para-phenylene diacetic acid, para-phenylene dipropionic acid, 5-t-butylisophthalic acid and 4,4'-dibenzylic acid;
OCNQNCO is selected from the group consisting of toluene diisocyanates, p- and m-phenylene diisocyanate, tetramethylene diisocyanate, 1,6-hexamethylene diisocyanate, 1,4-cyclohexylene diisocyanate, 3-isocyanatomethyl-3,5,5-trimethylcyclohexyl isocyanate, 4,4'-methylenedicyclohexyl diisocyanate, 4,4'-methylenediphenyl diisocyanate, 3,3'-dimethyl-4,4'-diphenylmethane diisocyanate, 1,5-tetrahydronaphthalene diisocyanate, dianisidine diisocyanate, bitolylene diisocyanate, naphthalene-1,4'-diisocyanate, bis(2-methyl-3-isocyanatephenyl)methane, bis(3-methyl-4-isocyanatephenyl)methane, 4,4'-diphenylpropane diisocyanate and polyphenyl polyisocyanates.

2. The vinyl ether terminated oligomer of claim 1 where R₂ is hydrogen and R₁ is an alkyl group of 1 to about 4 carbon atoms.

3. The vinyl ether terminated oligomer of claim 1 where R₁ and R₂ are hydrogen.

4. The vinyl ether terminated oligomer of claim 1 where R₁ is hydrogen and R₂ is methyl, or R₁ is methyl and R₂ is hydrogen.

5. The vinyl ether terminated oligomer of claim 1 where X is the same as Z.

6. The vinyl ether terminated oligomer of claim 1 where the diol of formula $[HO(CH_2)_n]_2R_3$ has n = 1 to 3.

7. The vinyl ether terminated oligomer of claim 6 where the diol is a bis(hydroxymethyl)cyclohexane.

8. The vinyl ether terminated oligomer of claim 7 where the diol is 1,4-bis(hydroxymethyl)cyclohexane.

9. The vinyl ether terminated oligomer of claim 1 where m is an integer from 1 to about 5.

10. The vinyl ether terminated oligomer of claim 1 where p is an integer from 1 to about 20.

11. The vinyl ether terminated oligomer of claim 1 where HO₂CYCO₂H is a phthalic acid.

12. The vinyl ether terminated oligomer of claim 11 where the acid is terephthalic acid.

13. The vinyl ether terminated oligomer of claim 12 where the acid is isophthalic acid.

14. The vinyl ether terminated oligomer of claim 1 where HO₂CYCO₂H is adipic acid.

15. The vinyl ether terminated oligomer of claim 1 where OCNQNCO is 4,4'-methylenedicyclohexyl diisocyanate.

16. The vinyl ether terminated oligomer of claim 1 where OCNQNCO is toluene diisocyanate.

17. A vinyl ether terminated oligomeric ester containing fewer than 5% unreacted alcoholic hydroxyl groups which is the reaction product of a mixture of alcohols containing 1 molar proportion of a vinyl ether terminated alcohol of the formula, $$R_1CH=CR_2OXOH,$$

and from 0.5 to about 100 molar proportions of a polyol of formula $Z(OH)_t$ with a sufficient amount of a dicarboxylic acid such that there are fewer than 5% free alcoholic hydroxyl groups in the resulting ester, where:
R₁ and R₂ are independently selected from the group consisting of hydrogen and lower alkyl moieties containing up to about 10 carbon atoms;
HOXOH is a bis(hydroxyalkyl)cycloalkane of formula $[HO(CH_2)_n]_2R_3$ where n is an integer from 1 to about 6, and R₃ is a divalent radical whose parent is a saturated cyclic hydrocarbon of ring size 5 to 8 carbons;
$Z(OH)_t$ is HOXOH; or is
(a) an alkylene diol of the formula $HO(C_qH_{2q})OH$, where q is an integer from 2 to about 10; or
(b) a poly(ethyleneoxy) or poly(propyleneoxy)glycol, $HO-[-CH_2CH_2O-]_m-H$ or $HO-[-CH(CH_3)CH_2-]_m-H$, respectively, where m is an integer from 1 to about 50; or (c) a higher polyol, where t is an integer which is at least 3.

18. The vinyl ether terminated oligomer of claim 17 where $R_2$ is hydrogen and $R_1$ is an alkyl group of 1 to about 4 carbon atoms.

19. The vinyl ether terminated oligomer of claim 17 where $R_1$ and $R_2$ are hydrogen.

20. The vinyl ether terminated oligomer of claim 17 where $R_1$ is hydrogen and $R_2$ is methyl, or $R_1$ is methyl and $R_2$ is hydrogen.

21. The vinyl ether terminated oligomer of claim 17 where the diol of formula $[HO(CH_2)_n]_2R_3$ has n=1 to 3.

22. The vinyl ether terminated oligomer of claim 21 where the diol is a bis(hydroxymethyl)cyclohexane.

23. The vinyl ether terminated oligomer of claim 22 where the diol is 1,4-bis(hydroxymethyl)cyclohexane.

24. The vinyl ether terminated oligomer of claim 17 where m is an integer from 1 to about 5.

25. The vinyl ether terminated oligomer of claim 17 where p is an integer from 1 to about 20.

26. The vinyl ether terminated oligomer of claim 17 where the dicarboxylic acid is selected from the group consisting of phthalic acids, polymethylene dicarboxylic acids, $HO_2C(CH_2)_rCO_2H$, where r is an integer from 2 to about 8, para-phenylene diacetic acid, para-phenylene dipropionic acid, 5-t-butylisophthalic acid and 4,4'-dibenzylic acid.

27. The vinyl ether terminated oligomer of claim 17 where the dicarboxylic acid is a phthalic acid.

28. The vinyl ether terminated oligomer of claim 27 where the acid is terephthalic acid.

29. The vinyl ether terminated oligomer of claim 27 where the acid is isophthalic acid.

30. The vinyl ether terminated oligomer of claim 17 where the acid is adipic acid.

31. A vinyl ether terminated oligomeric urethane containing fewer than 5% unreacted alcoholic hydroxyl groups which is the reaction product of a mixture of alcohols containing 1 molar proportion of a vinyl ether terminated alcohol of the formula, $R_1CH=CR_2OXOH$, and from 0.5 to about 100 molar proportions of a polyol of formula $Z(OH)_t$ with a sufficient amount of a diisocyanate such that there are fewer than 5% free alcoholic hydroxyl groups in the resulting urethane, where:

$R_1$ and $R_2$ are independently selected from the group consisting of hydrogen and lower alkyl moieties containing up to about 10 carbon atoms;

HOXOH is a bis(hydroxyalkyl)cycloalkane of formula $[HO(CH_2)_n]_2R_3$ where n is an integer from 1 to about 6, and $R_3$ is a divalent radical whose parent is a saturated cyclic hydrocarbon of ring size 5 to 8 carbons;

$Z(OH)_t$ is HOXOH; or is
(a) an alkylene diol of the formula $HO(C_qH_{2q})OH$, where q is an integer from 2 to about 10; or
(b) a poly(ethyleneoxy) or poly(propyleneoxy)-glycol, $HO—[—CH_2CH_2O—]_m—H$ or $HO—[—CH(CH_3)CH_2—]_m—H$, respectively, where m is an integer from 1 to about 50; or
(c) a higher polyol, where t is an integer which is at least 3.

32. The vinyl ether terminated oligomer of claim 31 where $R_2$ is hydrogen and $R_1$ is an alkyl group of 1 to about 4 carbon atoms.

33. The vinyl ether terminated oligomer of claim 31 where $R_1$ and $R_2$ are hydrogen.

34. The vinyl ether terminated oligomer of claim 31 where $R_1$ is hydrogen and $R_2$ is methyl, or $R_1$ is methyl and $R_2$ is hydrogen.

35. The vinyl ether terminated oligomer of claim 31 where the diol of formula $[HO(CH_2)_n]_2R_3$ has n=1 to 3.

36. The vinyl ether terminated oligomer of claim 35 where the diol is a bis(hydroxymethyl)cyclohexane.

37. The vinyl ether terminated oligomer of claim 36 where the diol is 1,4-bis(hydroxymethyl)cyclohexane.

38. The vinyl ether terminated oligomer of claim 31 where m is an integer from 1 to about 5.

39. The vinyl ether terminated oligomer of claim 31 where p is an integer from 1 to about 20.

40. The vinyl ether terminated oligomer of claim 31 where the diisocyanate is selected from the group consisting of toluene diisocyanates, p- and m-phenylene diisocyanate, tetramethylene diisocyanate, 1,6-hexamethylene diisocyanate, 1,4-cyclohexylene diisocyanate, 3-isocyanatomethyl-3,5,5-trimethylcyclohexyl isocyanate, 4,4'-methylenedicyclohexyl diisocyanate, 4,4'-methylenediphenyl diisocyanate, 3,3'-dimethyl-4,4'-diphenylmethane diisocyanate, 1,5-tetrahydronaphthalene diisocyanate, dianisidine diisocyanate, bitolylene diisocyanate, naphthalene-1,4'-diisocyanate, bis(2-methyl-3-isocyanatephenyl)methane, bis(3-methyl-4-isocyanatephenyl)methane, and 4,4'-diphenylpropane diisocyanate and polyphenyl polyisocyanates.

41. The vinyl ether terminated oligomer of claim 40 where the diisocyanate is 4,4'-methylenedicyclohexyl diisocyanate.

42. The vinyl ether terminated oligomer of claim 40 where the diisocyanate is toluene diisocyanate.

* * * * *